(12) United States Patent
Nimri et al.

(10) Patent No.: US 10,474,412 B2
(45) Date of Patent: Nov. 12, 2019

(54) DIGITAL STORYBOARDS USING MULTIPLE DISPLAYS FOR CONTENT PRESENTATION AND COLLABORATION

(71) Applicant: Polycom, Inc., San Jose, CA (US)

(72) Inventors: Alain Elon Nimri, Austin, TX (US); Junqing Shao, Round Rock, TX (US); Shu Gao, Round Rock, TX (US); Rob Murphy, Austin, TX (US); Stephen Schaefer, Cedar Park, TX (US)

(73) Assignee: Polycom, Inc., San Jose, CA (US)

( * ) Notice: Subject to any disclaimer, the term of this patent is extended or adjusted under 35 U.S.C. 154(b) by 239 days.

(21) Appl. No.: 15/282,817

(22) Filed: Sep. 30, 2016

(65) Prior Publication Data

US 2018/0095709 A1    Apr. 5, 2018

Related U.S. Application Data

(60) Provisional application No. 62/236,520, filed on Oct. 2, 2015.

(51) Int. Cl.
*G06F 3/048* (2013.01)
*G06F 3/14* (2006.01)
(Continued)

(52) U.S. Cl.
CPC .......... *G06F 3/1423* (2013.01); *G06F 3/0481* (2013.01); *G06F 3/1454* (2013.01);
(Continued)

(58) Field of Classification Search
None
See application file for complete search history.

(56) References Cited

U.S. PATENT DOCUMENTS 8,543,940 B2 *   9/2013   Singhal ................. G06F 3/0482
                                                  382/284
8,704,777 B2 *   4/2014   Small ................. H04N 1/00127
                                                  345/1.3
(Continued)

FOREIGN PATENT DOCUMENTS

EP            2632190           8/2013

*Primary Examiner* — Andrey Belousov
*Assistant Examiner* — Haimei Jiang
(74) *Attorney, Agent, or Firm* — Blank Rome, LLP

(57) ABSTRACT

A digital storyboard system that uses multiple displays and related methods are disclosed. The systems and methods may be used to present graphical content such as slides of a slide shows or boards of a storyboard sequence simultaneously on multiple screens at each of a plurality of locations. One or more users of the system may, through their interface device, update or edit the content on any of the screens, resulting in real-time updates to those designated screens at all locations and on any interface devices on which those screens appear. Portable devices may be used to interface with the storyboard system to choose content, place content on display areas, edit and annotate content. Concurrent editing and/or annotating of content by multiple users is supported. The systems and methods may also partition screens at a plurality of locations into display areas to display different content, such that all content is visible at all locations, regardless of the number of available screens.

20 Claims, 8 Drawing Sheets

(51) Int. Cl.
  *G06F 3/0481* (2013.01)
  *H04L 29/08* (2006.01)
  *G09G 5/14* (2006.01)

(52) U.S. Cl.
  CPC ..... *G06F 2203/04803* (2013.01); *G09G 5/14* (2013.01); *H04L 67/10* (2013.01)

(56) References Cited

U.S. PATENT DOCUMENTS

| | | | |
|---|---|---|---|
| 8,988,457 B2 * | 3/2015 | Momosaki | G06F 16/4393 345/619 |
| 9,122,375 B2 * | 9/2015 | Gardenfors | G06F 3/0482 |
| 2009/0034463 A1 * | 2/2009 | Rao | H04W 4/08 370/329 |
| 2009/0046033 A1 * | 2/2009 | Siegel | G06F 3/1431 345/1.3 |
| 2011/0047489 A1 * | 2/2011 | Orr | G06F 3/0482 715/764 |
| 2011/0202866 A1 * | 8/2011 | Huang | G06F 3/0482 715/779 |
| 2013/0290872 A1 * | 10/2013 | Hong | H04L 65/403 715/753 |
| 2014/0258894 A1 * | 9/2014 | Brown | G06F 8/38 715/762 |
| 2014/0258968 A1 * | 9/2014 | Brown | G06F 17/21 717/103 |
| 2014/0310623 A1 * | 10/2014 | O'Connell, Jr. | G06F 16/958 715/764 |

* cited by examiner

DIGITAL STORYBOARDS USING MULTIPLE DISPLAYS FOR CONTENT PRESENTATION AND COLLABORATION

CROSS-REFERENCE TO RELATED APPLICATION

This application claims priority to U.S. Provisional Application No. 62/236,520, filed Oct. 2, 2015, the contents of which are entirely incorporated by reference herein.

TECHNICAL FIELD

This invention relates to the field of Internet-mediated communications. More particularly, the invention relates to systems and methods for displaying content on multiple display areas while creating a chronological presentation, restricting content to specific display areas, and/or simultaneously displaying content at multiple physical locations.

BACKGROUND

Content is of vital importance in today's collaborative working environment. There are well understood and widely used techniques in the "analog world" of presenting and collaborating with data, but our digital tools often fall short in bringing them seamlessly to the digital realm. One example is storyline in presentations. Story telling or storyline is a proven effective technique for structuring a presentation that dates back to pre-electronic age. People use multiple storyboards or flipcharts to develop their storyline. As the story progresses, the storyboards or flipcharts get filled or revealed one by one. At any moment, the audience can look back in time of the storyline effortlessly because the whole story is always there.

However, when people present content digitally, current technology limits those presentations to one monitor or one projector in a room. If the audience or presenter needs to examine an earlier slide, the presentation must be interrupted to recall that slide on the display. Such interruptions negatively impact the flow of the presentation and prevent the audience from quickly grasping the concepts presented. Furthermore, because every member of the audience must always view the same slide on the screen, audience members who do not wish to reexamine the previous slide are nevertheless forced to do so.

Even in cases where videoconferencing technology is used, in locations where multiple displays are installed, they are normally connected via a video splitter off of the main display. Consequently, these multiple displays do not refresh independently and remain under the control of a single administrator throughout the meeting. Consequently, there is a need in the art for systems and methods that allow for electronic storyboarding. There is a need for electronic storyboarding using multiple display screens. Further, there is a need for systems and methods that allow multiple users across multiple locations to view, edit, and interact with graphical output simultaneously on a plurality of screens.

SUMMARY

In order to overcome these and other disadvantages in the related art, there are provided systems and methods for a digital storyboard that use multiple displays. This invention is aimed at providing digital storyboarding by employing multiple content displays. Each display can show different content and the displays can be orchestrated to emulate physical storyboards and flipcharts. When the presenter advances a new slide or storyboard, the older slides or storyboards automatically "slide" over from one display to another, in a manner that the whole storyline can be presented "around the walls." Once the core configuration of multiple displays is established, its use case naturally extends from local presentation to local collaboration and to presentation and collaboration with remote participants. The digital storyboarding is particularly useful in multipoint video conferencing systems having multiple displays.

In an exemplary embodiment of the digital storyboard system, there is disclosed herein a method utilizing a plurality of computers, a network, a plurality of display devices, and a graphical user interface are used to display data. The method comprises accessing computers linked to a plurality of display devices through a network, where each display device is comprised of one or more display areas, retrieving a device identifier for each display device to identify those devices, retrieving a unique ID for each of the display areas such that they are identifiable on a graphical user interface, using the graphical user interfaces of the computers to associate content elements with the display areas based on the display areas' unique IDs, and storing the content elements as a presentation with a chronological identifier and a user's location in a presentation chronology.

In other exemplary embodiments of the digital storyboard system, there is disclosed a method utilizing a plurality of computers, a network, and a plurality of display devices to display data at multiple physical locations. The method comprises linking computers at multiple locations to a number of display devices through a network, where each display device is comprised of one or more display areas, retrieving a device identifier for each display device such that the display devices are identifiable on the computers, retrieving a unique ID for each display areas such that the display areas are identifiable, and transmitting content elements to the display areas based on the display areas' unique IDs so that the content elements are updated at the display areas with a matching unique ID at multiple locations simultaneously.

In another embodiment, the content element or slides are shifted or moved from one display area to the next in a storyboard fashion. Once all of the display areas are filled, as new content is introduced on a display area, the oldest content element or slide is removed. Removed content elements or slides may be stored. Also, content elements or slides may be annotated or edited while displayed. Those edits and annotations may be stored.

In another embodiment, participants or audience members may use portable devices to pick and flick content onto display areas. In a similar fashion, the participants or audience members may use portable devices to edit or annotate content shown on display areas. Control of the display areas is shared amongst presenter and others.

In yet another exemplary embodiment of the digital storyboard system, there is disclosed herein a method utilizing a plurality of computers, a network, and a plurality of display devices to display data on display areas based on content element permissions or rules. The method comprises linking computers to display devices through a network, where each display device has one or more display areas, retrieving a device identifier to each of the display devices so that the devices can be identified, retrieving a unique ID for each of display areas such that said display areas are identifiable, setting one or more content element permissions for the display areas, and transmitting content elements to the display areas based on the display areas' unique IDs in a way that ensures that content elements appear on the display areas based on the content element permissions that have been set.

BRIEF DESCRIPTION OF THE DRAWINGS

A more complete appreciation of this disclosure and many of the attendant advantages thereof will be readily obtained as the same becomes better understood by reference to the following detailed description when considered in conjunction with the accompanying drawings, wherein.

DETAILED DESCRIPTION

Figure 1A:
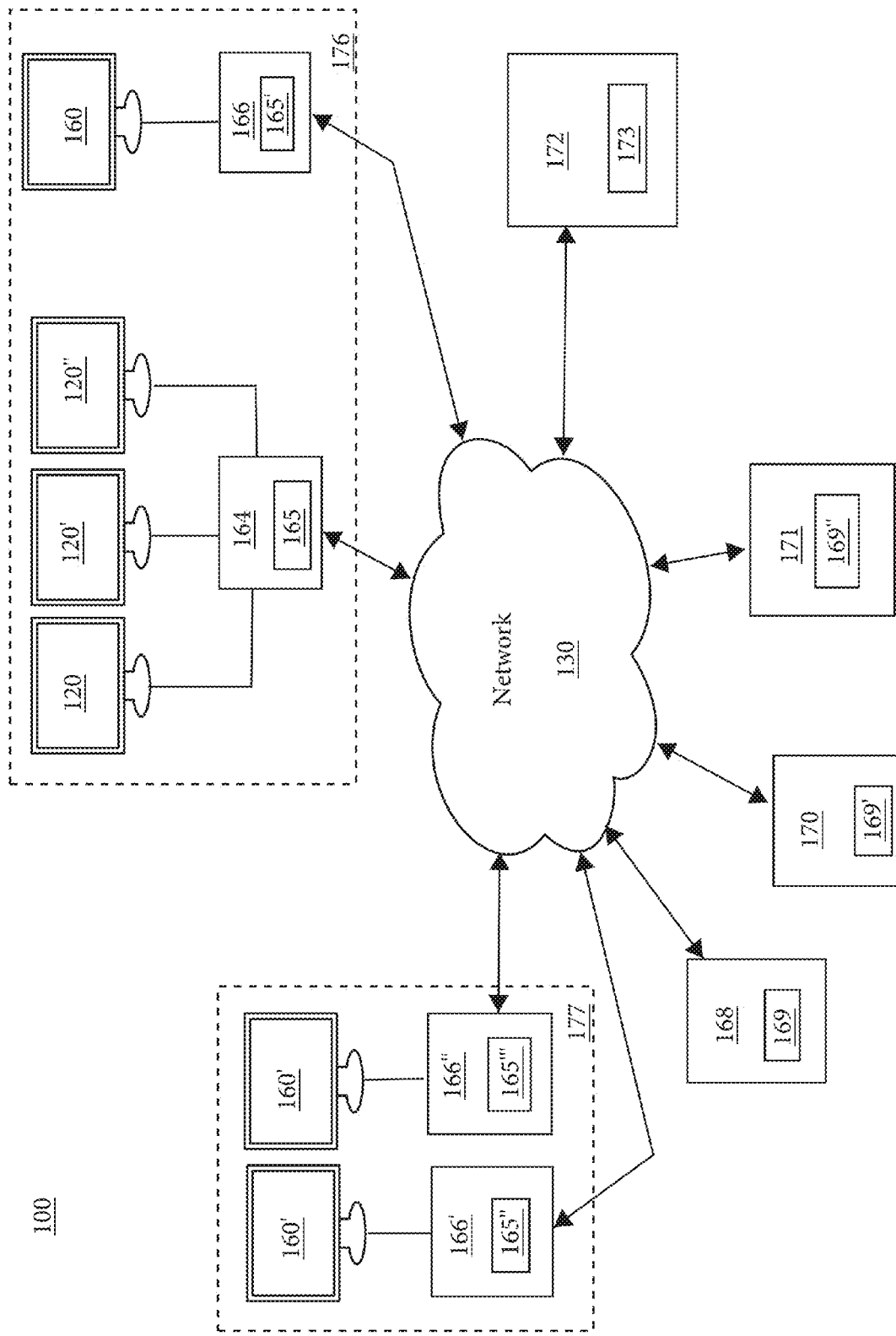
FIG. 1A shows an exemplary embodiment of a storyboarding system.

In describing aspects of this disclosure illustrated in the drawings, specific terminology will be resorted to for the sake of clarity. However, this disclosure is not intended to be limited to the specific terms so selected, and it is to be understood that each specific term includes all technical equivalents that operate in similar manner to accomplish a similar purpose. Several aspects of this disclosure are described for illustrative purposes, it being understood that teachings and aspects of this disclosure may be embodied in other forms not specifically shown in the drawings.

In an exemplary embodiment of a digital storyboard system, a plurality of computers having processors, a network, a plurality of display devices, and a graphical user interface are used to display data. At least one of the networked computer processors is programmed, configured to or adapted to: access computers linked to a plurality of display devices through a network, where each display device is comprised of one or more display areas, retrieve a device identifier for each display device to identify those devices, retrieve a unique ID for each of the display areas such that they are identifiable on a graphical user interface, use the graphical user interfaces of the computers to associate content elements with the display areas based on the display areas' unique IDs, allow for annotation and editing of displayed content, and store the content elements as a presentation with a chronological identifier and a user's location in a presentation chronology. The processor can also be programmed to allow for decentralized control including for example, open access to the display areas by participants for picking and/or flicking content, annotating, editing, changing the sequence and storing. The programming for the processor may be stored on a computer readable medium device. Participants may use application programs on portable devices to use the system.

Embodiments of this disclosure enable one or more users to automatically create a storyline using multiple display devices, such as digital displays, CRT television devices, projectors—any device capable of rendering reasonably detailed images. As will be described in greater detail below, a group of display devices can be collectively configured and controlled to enable a meeting participant place a first image on a first device and when a second image is moved to the first device, have the first image moved to the second device. The process is thus limited in this example to the number of display devices available onto which images can be pushed (see FIG. 1C). With regard to the "storyline" tool aspects of this disclosure, while it is contemplated that in many cases one image will be displayed per display device, it is possible within this disclosure to subdivide screens or displays to have more (and smaller) display regions. This can be useful when the number of display devices at two or more endpoints are not equal. For example a five display arrangement at one endpoint could be mirrored by four displays at a far end, in which one of the displays renders two images, and the other three each display one image. 'Image' includes image data, such as from word processing software, photographic data, web content, etc.

FIG. 1A shows an exemplary embodiment of a storyboarding system 100. There are two sites, 176 and 177, each of which can correspond to a meeting location. At site 176 there is a computer 164, such as a desktop computer which stores and executes storyboard host software 165. Computer 164 controls display devices 120, 120' and 120". Computer 164 is able to communicate through network 130 with other devices. Computer 166 controls display device 160 and also runs storyboard host software 165'. Host software 165 receives content and controls display devices 120, 160. Such display devices include but are not limited to televisions. Computer 166 can comprise Raspberry Pi™ hardware. Computer 166 is also able to communicate through network 130 with other devices. At site 177, there are two computers 166' and 166", each of which controls a display device 160', 160", and each of which is coupled to network 130. Also shown is laptop computer 168, handheld device 170, and desktop computer 171, each of which runs storyboard client software 169, 169', 169", and is connected to network 130. Client devices 168, 170, 171 can provide content to sites 176 and 177. Managing computer 172 runs storyboard manager software 173 and is connected to network 130. Managing computer 172 has a database to define monitor (e.g., 120) configurations and site 176, 177 configurations. Managing computer 172 provide addresses for client devices 168, 170, 171, enabling client devices to cooperate with sites 176 and 177.

Figure 1B:
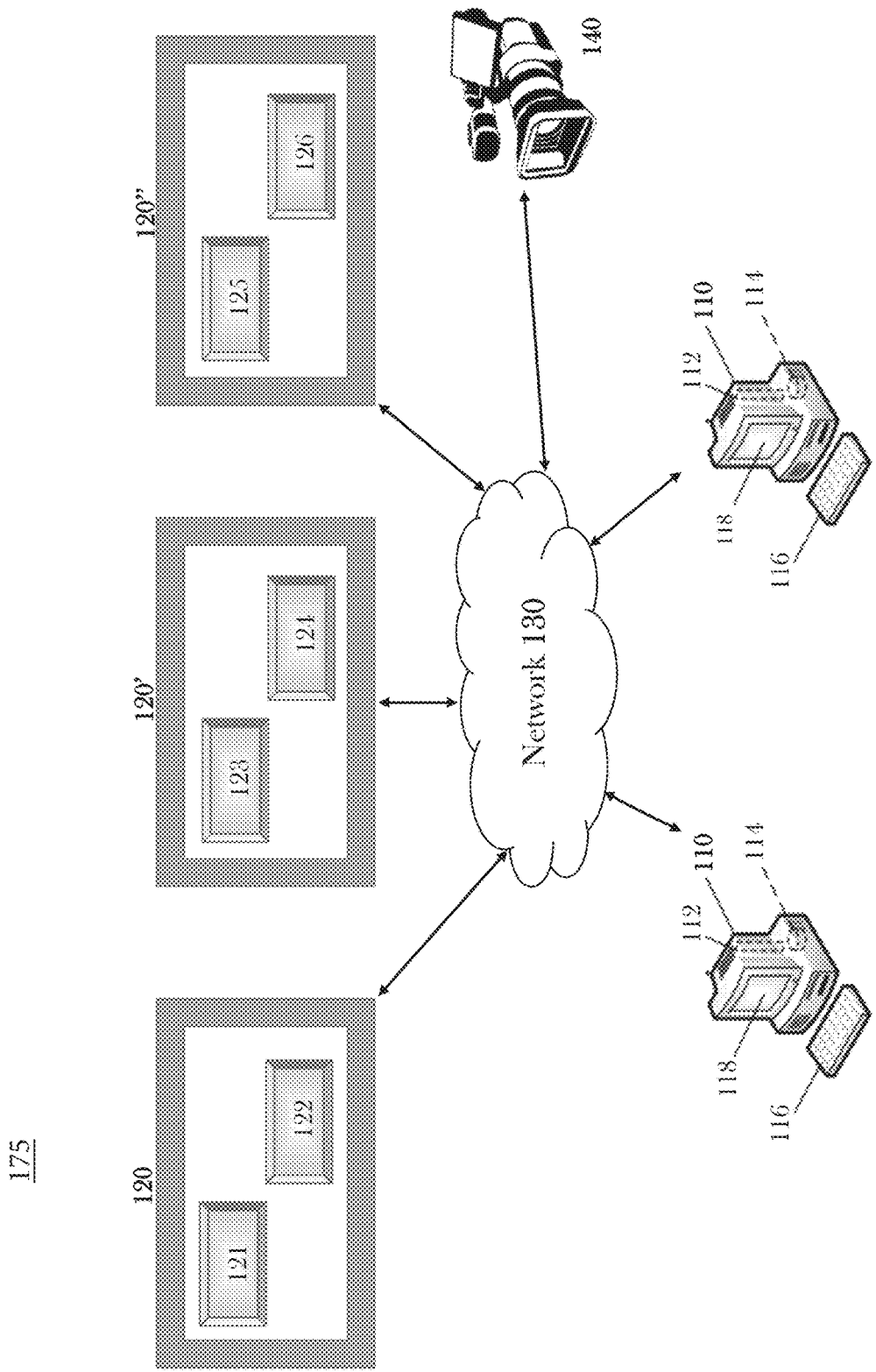
FIG. 1B shows an exemplary embodiment of a hardware implementation of the storyboarding system.

FIG. 1B shows one exemplary embodiment of the digital storyboard system, wherein a plurality of computers are connected to a plurality of display devices. In this embodiment, the one or more computers 110 are associated with a number of users. Each computer is comprised of a central processing unit 102, a storage medium 104, a user-input device 106, and a display 108. Examples of computers that may be used are: commercially available personal computers, open source computing devices (e.g. Raspberry Pi), commercially available servers, and commercially available portable devices (e.g. smartphones, smartwatches, tablets). In one embodiment, each of the computers 110 has software related to the storyboard system installed on it. The installed software may include a graphical user interface ("GUI") that allows for user interaction with the hardware described in FIG. 1B. The storyboard system is useful in the videoconferencing environment, particularly one in which large displays or multiple display areas are available. The systems and methods set forth herein enable presentation of content to be persistent across a computer network, such that all data associated with the meeting is saved in a state that allows users to continue the meeting at a later date from any location that can access the data.

The computers 110 may be connected directly to display devices 120 and also to a network 130. Alternatively, the computers 110 are connected to the plurality of display devices 120 through a network 130. The network 130 may be a wide-area network, like the Internet, or a local area network, like an intranet. Because of the network 130, the physical location of the computers 110 has no effect on the functionality of the hardware and software of this disclosure. Both implementations are described herein, and unless specified, it is contemplated that the computers 110 may be in the same or in different physical locations. Additional audiovisual equipment 140 such as cameras may be used to receive and broadcast audiovisual data. The audiovisual data may be shown on one or more of the display devices 120, 120', 120" of the system.

Communication between the hardware of the storyboard system (e.g. 100) may be accomplished in numerous known ways, for example using network connectivity components such as an Ethernet™ of Wifi™ adapter. Computers 110 and display devices 120 will both include or be attached to communication equipment. Communications are contemplated as occurring through industry-standard protocols such as HTTP.

The computer 110 connection to the display devices 120, 120', 120" allows for the computers 110 to identify and create one or more display areas 121, 122, 123, 124, 125, 126 on any and all of the display devices 120, 120', 120". Display devices 120, 120', 120" may include hardware components for communicating with user computers such as a central processing unit, a storage medium, and network connectivity hardware. Each display device 120, 120', 120" may include a plurality of display areas 121, 122, 123, 124, 125, 126 that are assigned identifiers. These display device identifiers may be, for example, device identifiers assigned by the system software or by the communication protocols used by the system. Device identifiers may be numbers, letters, or any other variable (e.g. IP addresses) stored by the computer 110 that allows for the identification of display areas 121, 122, 123, 124, 125, 126 on display devices 120, 120', 120". The display devices 120, 120', 120" and the active, identified display areas thereon 121, 122, 123, 124, 125, 126 are visible graphically on the computers 110, such that a user may drag and drop content into the display areas 121, 122, 123, 124, 125, 126.

Content elements that a user may add to the display areas 121, 122, 123, 124, 125, 126 includes text, video, images, or any other content that the user desires. Adding content elements to the display areas 121, 122, 123, 124, 125, 126 is application-neutral, such that a user may add content from any application running on his or her computer. Multiple types of content from one or more applications may be transferred to the display areas 121, 122, 123, 124, 125, 126. For example, a single display area may contain a combination of a plurality of text, video, and image data. Moreover, one or more users may upload content elements to the display areas 121, 122, 123, 124, 125, 126. These uploads of content elements to display areas 121, 122, 123, 124, 125, 126 by users may be performed concurrently to one or more of the display areas.

Figure 1C:
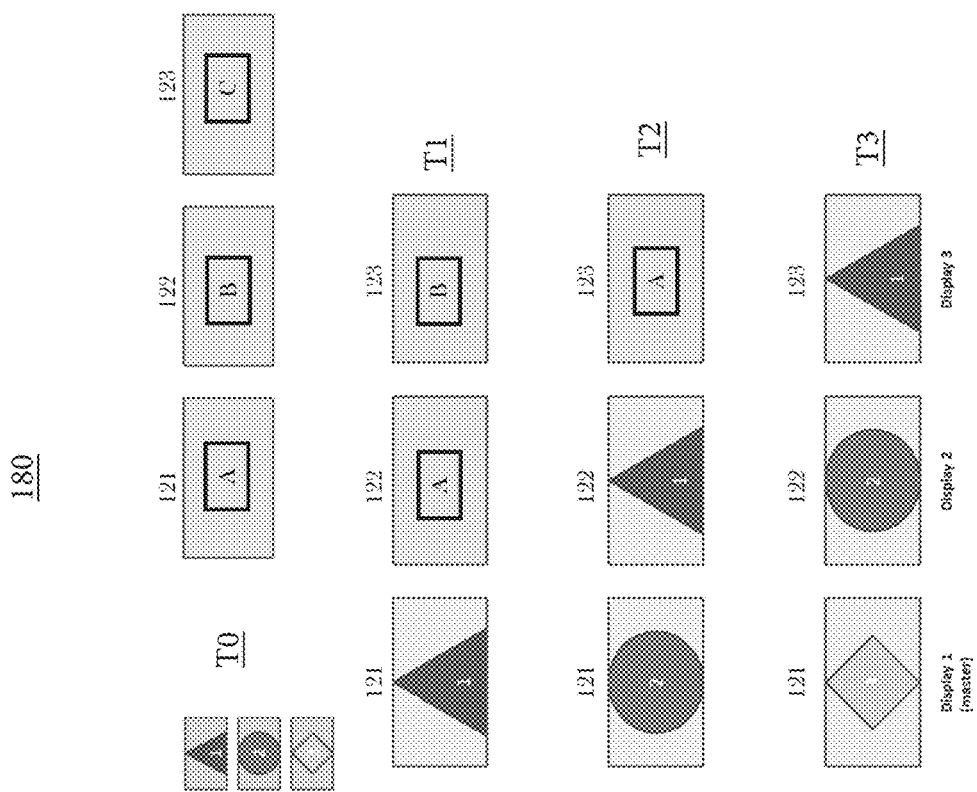
FIG. 1C shows an exemplary embodiment of the storyboarding system wherein content elements move across display areas.

In one embodiment of the digital storyboard system, the additional feature of content shifting is available, namely that the content on the display areas 121, 122, 123, 124, 125, 126 moves or shifts across the sequentially identified displays as new content is added. An exemplary movement of content elements across display areas 121, 122, 123 from time T0 through time T3 is shown in FIG. 1C. Display areas 121, 122, and 123 are active with content depicted as [A], [B], and [C]. The user has content elements depicted as [1], [2], and [3] available for upload. In one embodiment, if a user uploads new content element [1] to the first display area 121, the following events will occur: (1) previous content element [A] on the first display area 121 moves to the second display area 122; (2) previous content element [B] from the second display area 122 moves to the third display area 123; (3) previous content element [C] from third display area 123 is no longer visible. Other sequences or shifting of content elements are possible such as one or more of the display areas remaining static and the other display areas shifting or moving content elements. For example, the first display area 121 may have a static display of the overall presentation, such as an outline or thumbnail, while the second and third display areas shift content showing two storyboards, two slide or other content at a time. In this way, the first display area can be a master display area. In another example, one or more of the display areas may be restricted to certain content elements or certain types of content, as explained further in FIG. 3. In some embodiments, the display devices 120-120" are configured to communicate with each other, such as to better synchronize transfer content amongst them In general, content elements that are no longer visible because they have been incrementally shifted off the display areas 121, 122, 123, 124, 125, 126 may be saved to a storage medium. A chronological identifier is stored along with the content elements that are shifted off display areas 121, 122, 123, 124, 125, 126. For example, in FIG. 1C, content element [C], when shifted off display area 123, will receive a chronological identifier (e.g. date time stamp, serial number, sequence number) identifying it as the first content element. As content elements incrementally shift off the display areas 121, 122, 123, 124, 125, 126, the sequential chronological numbering will create a saved presentation of ordered content elements (e.g. a slideshow, sequence of storyboards).

All embedded content from the display area may be stored, such that recalling the content to one of the display areas will result in all previous content shown on that display area being accessible to the users. As new content is added or pushed to display areas 121, 122, 123, 124, 125, 126, previous content elements are shifted off display areas 121, 122, 123, 124, 125, 126 and may be sent to a storage medium. Data regarding the positions, relative placements, and sizes of content elements on display areas 121, 122, 123, 124, 125, 126 may be stored on the storage medium along with the content elements themselves. The presentation can then be retrieved from any computer 110 at any physical location that is connected to the network 130. The presentation can then be shown again or recreated.

Once content elements are uploaded to the display areas, users using computers 110 are free to use an interface such as a GUI to edit the content elements, add content elements, or remove content elements from the display areas 121, 122, 123, 124, 125, 126. In alternate configurations, the display devices 120 may include touchscreen technologies known in the art. In those cases, a user may use a mouse, a stylus, or the touchscreen itself to edit the content elements appearing on the display areas 121, 122, 123, 124, 125, 126 of the display devices 120. For example, the first display area 121 may be a master display area having a touchscreen system or be a smart board for use in selecting content elements to place on display areas. In this alternate embodiment, a computer 110 is thus not required to edit content elements.

Figure 1D:
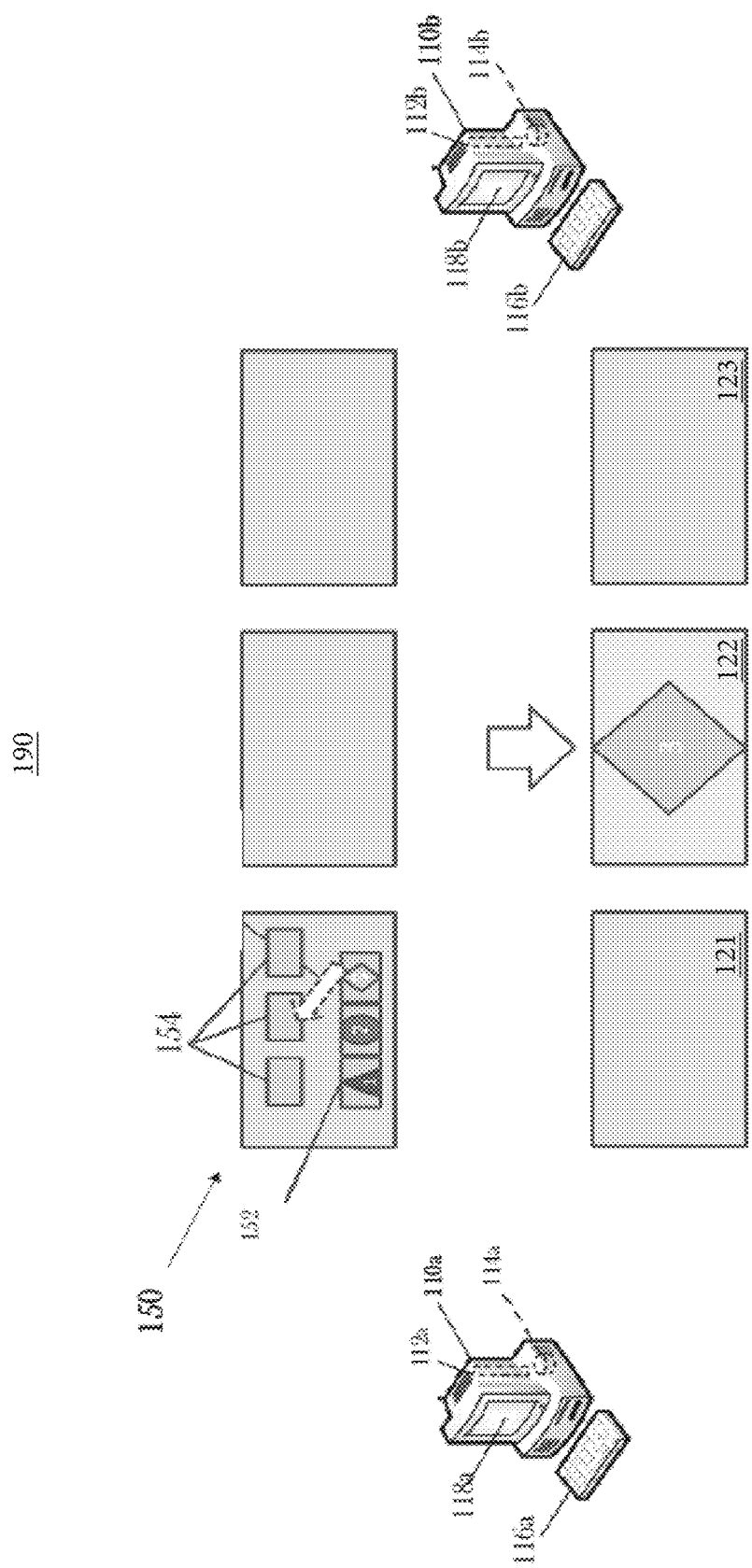
FIG. 1D shows an exemplary process by which content elements are "picked and flicked" to display areas.

Another aspect of the storyboard system is a "pick and flick" feature, as shown in FIG. 1D. "Pick and flick" refers to selecting and transferring an object to another screen or display area. In this embodiment, through the GUI, the user selects ("picks") an object (text, graphics, video or combination thereor) and drags ("flicks") it into a representation of one of the display areas on the GUI. In this embodiment, the user, operating computing device, can "pick and flick" content onto any of the available screens. In one such embodiment, one of the computers 110*a* functions as the master computer, while other computers 110*b* operate in an editorial capacity. Consequently, as shown in FIG. 1D, master computer 110*a* has a GUI containing the slides of content elements of a previously created presentation. In one embodiment, the GUI includes a heads-up display or pop-up window. Three display areas 121, 122, and 123 are shown active in this exemplary embodiment, but it will be readily apparent to one of ordinary skill in the art that any number of such display areas may be used. It will be further apparent that alternate embodiments of the storyboard system will allow for multiple computers 110*a* to operate as master computers.

An exemplary interface, GUI 150, is shown as it may appear on computer 110*a*. The GUI 150 may be comprised of a heads-up display or slide deck 152 displaying the content elements available on computer 110*a*. The GUI can display information such as a slide deck (or even more than one, such as might be added by a meeting participant), and renderings corresponding to one or more of the other display devices available to the user. Other controls may be present, such as for content editing, placement of closed captioning information, and the like. Typically, each master computer 110*a* is comprised of a central processing unit 112*a*, a storage medium 114*a*, a user-input device 116*a*, and a display 118*a*. A user on the master computer (such as a PC, laptop, smartphone, for example) 110*a* is able to scroll through content elements on the slide deck 152, shown as [1], [2], [3], select one of the content elements, and "pick and flick" those content elements to one of active display areas 121, 122, 123, which appear on the master computer 110*a* as GUI display areas 154. The content element selected by the user on the master computer 110*a* then appears on the display area 121, 122, or 123 to which it has been "flicked" or assigned. More specifically, once a content element 152 has been assigned to a GUI display area 154, that content element will appear on its corresponding display area 121, 122, or 123. This display will occur across all computers (110*a* and 110*b*) and on all display areas 121, 122, or 123, across all locations sharing content. Computer 110*b* refer to editorial computers that allow for editing of content elements 152 that have been uploaded from the master computer 152. Similar to the master computer 110*a*, each editor computer 110*b* is typically comprised of a central processing unit 112*b*, a storage medium 114*b*, a user-input device 116*b*, and a display 118*b*.

From the master computer 110*a*, a user can continually "pick and flick" content elements to the display areas 121, 122, or 123. As shown in FIG. 1D, the user on master computer 110*a* selects content element [3] and moves it to the second GUI display area 154, which corresponds to the second display area 122. Other users on computers 110*b* have the capability to edit or annotate content elements 152 (e.g. using a stylus to draw on them) that appear on the second display area 122. In embodiments including presentation storage, once content elements are replaced on a display area, the replaced content element and all of its edits or annotations are stored at a storage medium along with a chronological identifier. In at least one embodiment, a user can pick and "down flick," that is select information displayed for rendering on her personal device. Thus users can collectively have the same overall presentation experience, while still being able to customize how they track information.

All embedded content from the display area is stored, such that recalling the content to one of the display areas will result in all content shown on that display area being accessible to the users. As more content is added to display areas 121, 122, or 123, previous content elements are shifted off display areas 121, 122, or 123 and to a storage medium. The positions, relative placements, and sizes of content elements on display areas 121, 122, or 123 are stored on the storage medium along with the content elements themselves. The progressive replacement of content elements on the display areas 121, 122, or 123 thus results in the creation of a presentation (e.g. a slideshow, storyboards, succession of scenes). In at least one embodiment, all information from a given presentation is stored such that it can be retrieved and presented again in the same manner.

Figure 2:
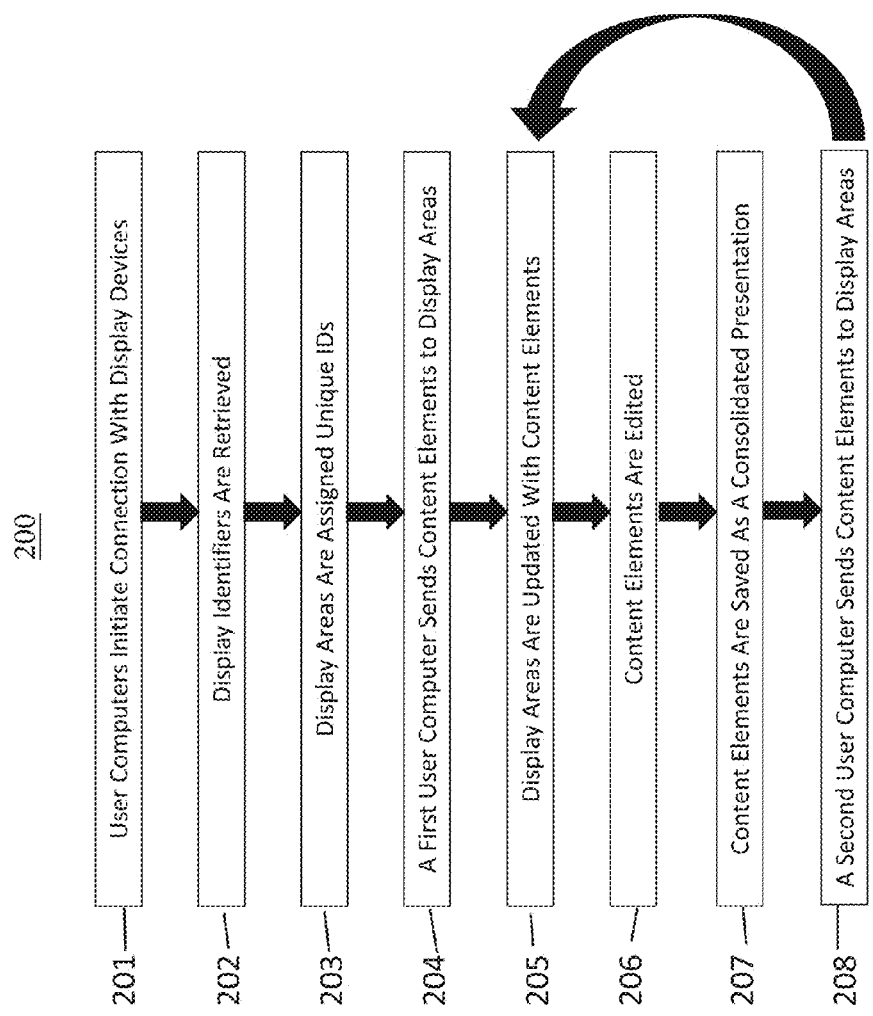
FIG. 2 shows an exemplary software process by which the system automatically creates a saved, retrievable presentation.

An exemplary embodiment of the processes performed by the software of the storyboard system is outlined by FIG. 2. Software may run on the computers 110 and/or the display devices 120. The software may be stored on any storage medium accessible or networked to the system devices. The software may operate as a single program or as a set of modules. In this exemplary embodiment 200, at step 201, the computers 110 initiate a connection with the display devices 120 over the network 130. At step 202, the device identifiers of display devices are retrieved, allowing identification and addressability of each active display device 120 to each of the computers 110. This may be accomplished using IP addresses or similar network addresses. At step 203, the computers 110 are used to determine how many display areas will be used in the implementation, where those display areas will appear on the active display devices, and how those display areas will be oriented. Display areas are each assigned a unique ID that is retrieved by the computers 110.

Having completed initial setup of the system, at step 204, a user on a computer 110 may then "pick and flick" content elements to display areas. As a result of this action, at step 205, the selected display area is updated with the content element or elements selected by the user of computer 110. The display area with the same unique ID as that selected by the user of computer 110 is updated with the content element or elements on all computers 110 connected to the system. While this is explained as being accomplished with a computer, any appropriate digital device may be used that is able to communicate with one of the computers 110 shown, one of the display devices 121, 122, 123 or other hardware on the network. This communication can occur on any known or future method of electronic communication (for example, wired or wireless, Wi-Fi, near field, cellular, etc.). Some examples of such devices are laptops, tablets, pads, smartphones, smartwatches, personal electronic devices, and the like. Applications can be loaded on these devices enabling them to interface with the storyboarding system. In this manner any user or participant (such as an audience member) on a portable electronic device can pick content from that device and flick content onto a display area.

At step 206, as explained with regard to FIG. 1D, the other users on the computers 110 can edit uploaded content elements. As the content elements are edited by users of the computers 110, the display area with the same unique ID is updated with the content element or elements on all computers 110 connected to the system. These updates preferably occur in real-time on all computers 110 connected to the system. Alternatively, a master computer can track all of these changes. In this manner, an audience member can annotate an image shown on a display area using a portable electronic device.

At step 207, as explained above with regard to FIG. 1C, as content elements are removed from the display areas, they are assigned chronological identifiers, such as by host computer 164 or managing computer 172. In this manner, as additional content elements replace previous content elements on display areas, the sequential chronological identification of these content elements results in the creation of a presentation (e.g. a slideshow, sequence of storyboards) that is saved on a storage medium networked to the system. Consequently, a user of computers 110 can close down the system, re-implement the system, and resume the presentation from any content element, while retaining the ability to scroll through those content elements chronologically. Further, the presentation can be "replayed" in the order of its original presentation.

At step 208, a second user from a different computer 110 may send a content element to a display area based on its unique ID. Sending such content elements to the display areas of the system results in the exemplary process of the software looping back to the process of updated display areas with content elements, step 205. In this manner, the process of the system continually updates and maintains a record of all content elements displayed in the course of a presentation, as by managing computer 172. Again, an audience member can flick content from a portable device to a display area with a unique ID.

In one embodiment, what is shown on the display areas (e.g. content element, slides, storyboards) are shifted or moved from one display area to the next in a sequential storyboard fashion. This can be done for instance from left to right across the display areas in a video conference room. Once all of the display areas are filled with content, as new content is introduced on a display area, the oldest content element or slide is removed. Removed content elements or slides may be stored in temporary or more permanent computer storage. Therefore, when there are "n" number of display areas in a room and when the picked and flicked content elements number "n+1", the system and method removes the oldest picked and flicked content element from display, leaving only the most recent shown on the display areas.

Also, content elements or slides may be annotated or edited while displayed. Those edits and annotations may be stored as the content is removed from the display areas or earlier in the process.

Figure 3:
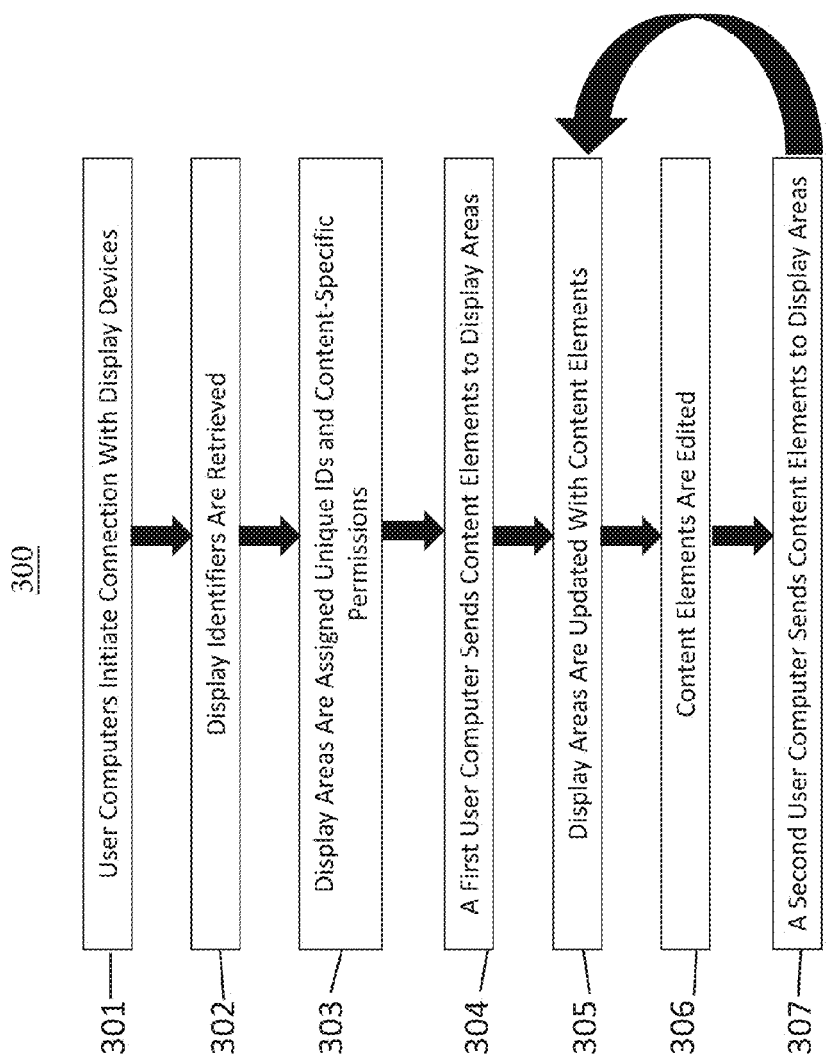
FIG. 3 shows an exemplary software process by which the system has content elements that are given permissions to specific display areas.

An alternate embodiment of the processes performed by the software of the system is outlined by FIG. 3. In this alternate embodiment, content elements are given permissions to be displayed on specific display areas. This alternative embodiment is particularly useful for multi-display screen systems in which some displays are not suited for certain content elements or are unable to display certain content elements. This may be because of display size, resolution or the like.

Software related to the system may run on the computers 110 or the display devices 120. The software may be stored on any storage medium accessible or networked to the system devices. Such software can cause the computers of this disclosure to execute process 300, such software may operate as a single program or as a set of software modules. In this exemplary process 300, at step 301, the computers 110 initiate a connection with the display devices 120 over the network 130. At step 302, the device identifiers of display devices are retrieved, identifying each of the display device 120 to each of the computers 110. At step 303, the software assigns display areas a unique ID that is retrieved by the computers 110. Numerous display areas may be used concurrently. Additionally, at step 303, the computers 110 are used to restrict the types of content elements (e.g. video, text, or images) that are allowed to appear on specific display areas. In this manner, the system sets permissions for the various display areas of the exemplary implementation. For example, video may be restricted to display areas resident on one large high resolution screen.

Having completed initial setup of the system, at step 304, a user on a computer 110 then "picks and flicks" content elements to display areas. As a result of this action, at step 305, the selected display area is updated with the content element or elements selected by the user of computer 110. The display area with the same unique ID as that selected by the user of computer 110 is updated with the content element or elements on all computers 110 connected to the system and corresponding displays in all physical locations.

At step 306, as explained with regard to FIG. 1D, the other users on the computers 110 can edit uploaded content elements. As the content elements are edited by users of the computers 110, the display area with the same unique ID updated with the content element or elements on all computers 110 connected to the system. These updates preferably occur in real-time on all computers 110 connected to the system.

At step 307, a second user from a different computer 110 may send a content element to a display area based on its unique ID. Sending such content elements to the display areas of the system results in the exemplary process of the software looping back to updating the display area with content elements, step 305. In this manner, in this embodiment, the process of the system continually updates and maintains a record of all content elements displayed in the course of a presentation. In other embodiments, records are not maintained or are transient.

Figure 4:
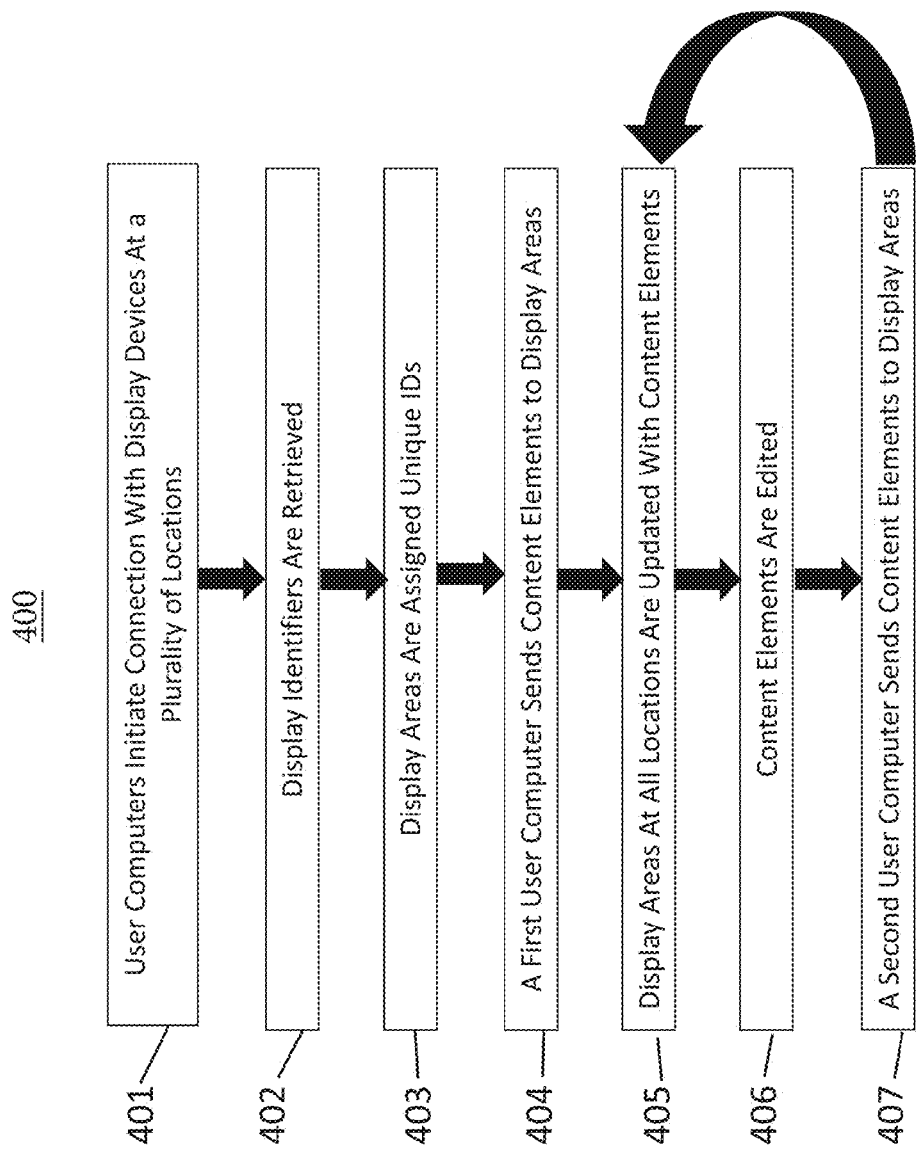
FIG. 4 shows an exemplary software process by which the system has content elements update across multiple physical locations simultaneously.

Another alternate embodiment of the processes performed by the software of the system is outlined by FIG. 4. In this alternate embodiment, content elements update across multiple physical locations simultaneously. This embodiment is useful in video conferencing scenarios.

FIG. 4 illustrates a method 400 of content sharing and control in accordance with an embodiment of this disclosure. At step 401, the computers 110 initiate a connection with the display devices 120 over the network 130. The computers 110 and the display devices 120 may be located at a plurality of physical locations.

At step 402, the device identifiers of display devices are retrieved, identifying each of the display devices to each of the computers 110. In situations where there are an unequal number of display devices across different physical locations, the software will identify the inequality and initiate a further process as explained in step 403.

At step 403, the computers 110 are used to assign display areas on display devices a unique ID. If an unequal number of display devices 120 have been identified at step 402, then the system software will check whether all physical locations have the same number of unique IDs. The software will also check whether users have set the system preferences to allow for an unequal number of display areas across locations. If there are an unequal number of unique IDs and the user preferences do not allow for such an implementation, at step 403, the software will partition display areas at the different physical locations to ensure an identical number of display areas with matching unique IDs across locations. The unique IDs of the display areas are retrieved by the computers 110. Additionally, at step 403, the computers 110 are used to restrict the types of content elements (e.g. video, text, or images) that are allowed to appear on specific display areas. In this manner, the system sets permissions for the various display areas of the exemplary implementation.

Having completed initial setup of the system, at step 404, a user on a computer 110 then "picks and flicks" content elements to display areas. As a result of this action, at step 405, the selected display area is updated with the content element or elements selected by the user of computer 110. The display area with the same unique ID as that selected by the user of computer 110 is updated with the content element or elements on all computers 110 connected to the system. The display area with the same unique ID as that selected by the user of computer 110 is updated with the content element or elements at all physical locations and on all computers 110 connected to the system.

At step 406, as explained with regard to FIG. 1D, the other users on the computers 110 can edit uploaded content elements. As the content elements are edited by users of the computers 110, the display area with the same unique ID is updated with the content element or elements on all computers 110 connected to the system and across all physical locations simultaneously. These updates preferably occur in real-time on all computers 110 connected to the system and across all physical locations simultaneously.

At step 407, a second user from a different computer 110 may send a content element to a display area based on its unique ID. Sending such content elements to the display areas of the system results in the exemplary process of the software looping back to step 405. In this manner, the process of the system continually updates and maintains a record of all content elements displayed in the course of a presentation. Uploading content elements to display areas at one location thus results in the same content elements appearing on display areas with matching unique IDs at other locations.

Figure 5:
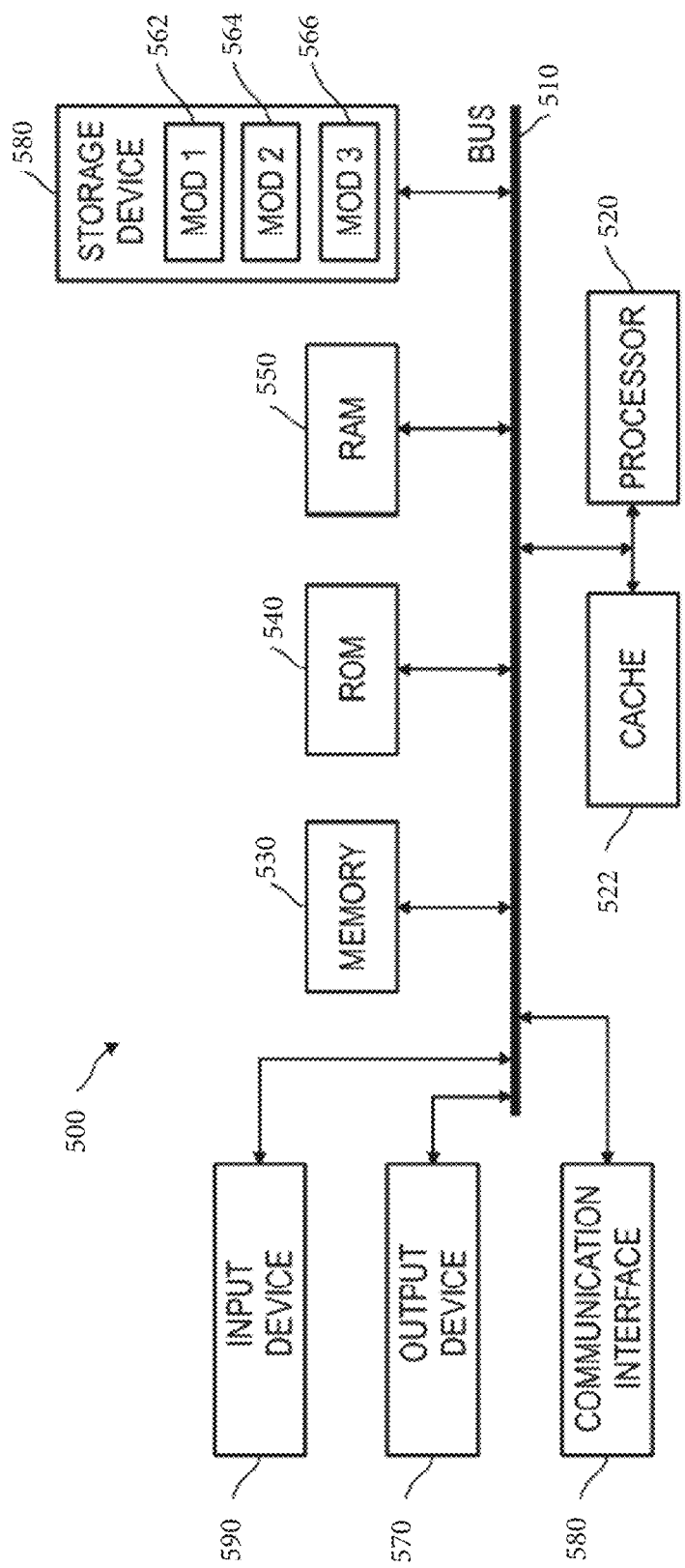
FIG. 5 shows an exemplary computing device.

The disclosure now turns to a brief description of a computing device, as shown in FIG. 5, which can be employed to practice the concepts and methods described above for content presentation and collaboration using multiple displays. The components disclosed herein can be incorporated in whole or in part into tablet computers, personal computers, handsets, transmitters, servers, and any other electronic or other computing device.

With reference to FIG. 5, an exemplary system 500 includes a computing device 500, including a processing unit (CPU or processor) 520 and a system bus 510 that couples various system components including the system memory 530 such as read only memory (ROM) 540 and random access memory (RAM) 550 to the processor 520. The system 500 can include a cache 522 of high speed memory connected directly with, in close proximity to, or integrated as part of the processor 520. The system 500 copies data from the memory 530 and/or the storage device 560 to the cache 522 for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 (562), module 2 (564), and module 3 (566) stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output system (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer readable storage media provide non-volatile storage of computer readable instructions, data structures, program modules and other data for the computing device 500. In one aspect, a hardware module that performs a particular function includes the software component stored in a non-transitory computer-readable medium in connection with the necessary hardware components, such as the processor 520, bus 510, output device 570 (e.g. one or more displays, speakers), and so forth, to carry out the function.

Although the exemplary embodiment described herein employs the hard disk 560, it should be appreciated by those skilled in the art that other types of computer readable media which can store data that are accessible by a computer, such as magnetic cassettes, flash memory cards, digital versatile disks, cartridges, random access memories (RAMs) 550, read only memory (ROM) 540, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can comprise one or more of a number of output mechanisms, such as one or more projectors, imaging devices and the like to render images. In some instances, multimodal systems enable a user (meeting participant) to provide multiple types of input to communicate with the computing device 500. The communications interface 580 generally governs and manages the user input and system output. There is no restriction on operating on any particular hardware arrangement and therefore the basic features here may be substituted for improved hardware or firmware arrangements as they are developed.

For clarity of explanation, the embodiment of FIG. 5 is presented as including individual functional blocks including functional blocks labeled as a "processor" or processor 520. The functions these blocks represent may be provided through the use of either shared or dedicated hardware, including, but not limited to, hardware capable of executing software and hardware, such as a processor 520, that is purpose-built to operate as an equivalent to software executing on a general purpose processor. For example the functions of one or more processors presented in FIG. 5 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 540 for storing software performing the operations discussed below, and random access memory (RAM) 550 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 500 shown in FIG. 5 can practice all or part of the recited methods, can be a part of the recited systems, and/or can operate according to instructions in the recited non-transitory computer-readable storage media. Such logical operations can be implemented as modules configured to control the processor 520 to perform particular functions according to the programming of the module.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

EXAMPLES

A. A method utilizing a plurality of computers, a network, and a plurality of display devices to display data comprising: accessing one of a plurality of computers linked to a plurality of display devices through a network, each of said display device comprised of one or more display areas; retrieving a device identifier for each of the plurality of display devices such that said display devices are identifiable on a graphical user interface running on one of the plurality of computers; retrieving a unique ID for each of the plurality of display areas such that said display areas are identifiable on the graphical user interface; associating, using the graphical user interfaces of the plurality of computers, a plurality of content elements with the plurality of display areas based on the display areas' unique IDs, said associations assisting in display of the content elements on the display areas; and storing, on a storage medium, the content elements as a presentation with a chronological identifier and a user's location in a presentation chronology.

B. The method of example A, further comprising editing content elements directly on the plurality of display areas.

C. The method of example B, further comprising syncing the edited content elements on the plurality of computers.

D. The method of example A, wherein the content elements are one of: text, audio, video, graphics, an audiovisual broadcast of any of the plurality of locations, or combination thereof.

E. A method utilizing a plurality of computers, a network and a plurality of display devices comprised of a plurality of display surfaces to display data comprising: providing a first software module that connects a plurality of computers to a plurality of display areas through a network, said first software module capable of assigning a unique ID to each of the plurality of display areas; providing an interface for a user to select a plurality of content elements for display; providing a second software module that associates a plurality of content elements to the plurality of display areas based on their unique IDs, said association resulting in the display of the content elements on the display area; wherein the second software module permits content elements on any of the plurality of computers connected to at least one of the plurality of display surfaces to replace the content elements displayed on the display area; and wherein the second software module causes to be stored, on a storage medium, the content elements as a presentation with a chronological identifier and the user's location in a presentation chronology.

F. The method of example E, wherein the first software module runs on one of the plurality of computers or on a content collaboration server.

G. The method of example E, wherein the second software module runs on one of the plurality of computers or on the plurality of display devices.

H. The method of example E, wherein a third software module permits editing of content elements that appear on the display areas.

I. The method of example E, wherein a fourth software module permits editing of content elements through direct interaction with any of the plurality of display devices.

J. A method utilizing a plurality of computers, a network, and a plurality of display devices to display data comprising: linking a plurality of computers to a plurality of display devices through a network, each of said display device comprised of one or more display areas; retrieving a device identifier for each of the plurality of display devices such that said display devices are identifiable on a graphical user interface running on one of the plurality of computers; retrieving a unique ID for each of the plurality of display areas such that said display areas are identifiable on the graphical user interface; transmitting a plurality of content elements to the plurality of display areas based on the display areas' unique IDs; and storing, on a storage medium, the content elements as a presentation with a chronological identifier and a user's location in a presentation chronology.

K. The method of example J, further comprising the step of editing content elements that appear on the display areas.

L. The method of example K, further comprising the step of editing content elements through direct interaction with any of the plurality of display devices.

M. A method utilizing a plurality of computers, a network, a plurality of display devices, and a plurality of audiovisual equipment to display data at a plurality of locations comprising: linking a plurality of computers to a plurality of display devices through a network, each of said display device comprised of one or more display areas; retrieving a device identifier to each of the plurality of display devices such that said display devices are identifiable on the graphical user interface running on the plurality of computers; retrieving a unique ID for each of the plurality of display areas such that said display areas are identifiable on the graphical user interface running on the plurality of computers; transmitting a plurality of content elements to the plurality of display areas based on the display areas' unique IDs; and partitioning, optionally, a plurality of display areas on the display devices at the plurality of locations, such that every location has an equal number of display areas with matching unique IDs.

N. The method of example M, further comprising the step of editing content elements that appear on the display areas.

O. The method of example N, further comprising the step of editing content elements through direct interaction with any of the plurality of display devices.

P. A method utilizing a plurality of computers, a network, a plurality of display devices, and a plurality of audiovisual equipment to display data at a plurality of locations comprising: accessing a plurality of computers linked to a plurality of display devices through a network, wherein at least one of the plurality of computers is a master computer; retrieving a device identifier to each of the plurality of display devices such that said display devices are identifiable on the graphical user interface running on the plurality of computers, wherein one of the display devices is a master display area; retrieving a unique ID for each of the plurality of display areas such that said display areas are identifiable on the graphical user interface running on the plurality of computers; displaying on the master computer a set of content elements; and selecting and transferring from the set of content elements on the master computer, such that the selected and transferred content elements advance in order across display areas, beginning with the master display area.

Q. The method of example P, further comprising the step of editing content elements on one of the plurality of display areas.

R. The method of example Q, wherein the step of editing of content elements can be performed using the graphical user interface of any of the plurality of computers or through direct interaction with any of the plurality of display devices.

S. The method of example P, further comprising the step of syncing the edited content elements on one of the plurality of computers.

T. The method of example P, wherein the content elements are one or more of: an audiovisual broadcast of any of the plurality of locations, text, audio, video, graphics, or combination thereof.

U. The method of example P wherein the picked and flicked content elements number n+1 and the plurality of display areas number n, the method further comprising removing an oldest picked and flicked content element from display.

V. A method utilizing a plurality of computers, a network, and a plurality of display devices to display data comprising: linking a plurality of computers at a plurality of locations to a plurality of display devices at a plurality of locations through a network, each of said display device comprised of one or more display areas; retrieving a device identifier to each of the plurality of display devices such that said display devices are identifiable on a graphical user interface running on one of the plurality of computers; retrieving a unique ID for each of the plurality of display areas such that said display areas are identifiable on the graphical user interface; transmitting a plurality of content elements to the plurality of display areas based on the display areas' unique IDs; wherein said transmission updates the content elements at the display areas with a matching unique ID at a plurality of locations simultaneously.

W. The method of example V, further comprising the step of editing content elements on the display areas.

X. The method of example V, wherein the step of editing of content elements can be performed using the graphical user interface of any of the plurality of computers or through direct interaction with any of the plurality of display devices.

Y. The method of example V, further comprising the step of syncing the edited content elements on the plurality of computers.

Z. The method of example V, wherein the content elements are one of: an audiovisual broadcast of any of the plurality of locations, text, audio, video, graphics, or combination thereof.

AA. A method utilizing a plurality of computers, a network, and a plurality of display devices, to display data at a plurality of locations comprising: linking a plurality of computers to a plurality of display devices through a network, each of said display devices comprised of one or more display areas; retrieving a device identifier to each of the plurality of display devices such that said display devices are identifiable on the graphical user interface running on the plurality of computers; retrieving a unique ID for each of the plurality of display areas such that said display areas are identifiable on the graphical user interface running on the plurality of computers; setting one or more content element permissions for the display areas; and transmitting a plurality of content elements to the plurality of display areas based on the display areas' unique IDs; wherein the content elements appear on the display areas based on the content element permission settings.

BB. The method of example AA, further comprising the step of editing content elements on the display areas.

CC. The method of example BB, wherein the step of editing of content elements can be performed using the graphical user interface of any of the plurality of computers or through direct interaction with any of the plurality of display devices.

The foregoing description and drawings should be considered as illustrative only of the principles of the present invention. This disclosure may be configured in a variety of shapes and sizes and is not intended to be limited by the shown embodiments. For example, elements of the software processes of FIGS. 2 through 4 may be combined in any useful manner that will be readily apparent to skilled artisans. Numerous applications of this disclosure will readily occur to those skilled in the art. Therefore, it is not desired to limit the invention to the specific examples disclosed or the exact construction and operation shown and described. Rather, all suitable modifications and equivalents may be resorted to, falling within the scope of this disclosure. The scope of the invention is set forth in the following claims.

The invention claimed is:

1. A method for displaying information in a story-board fashion utilizing a plurality of computing devices, a network, and a plurality of display devices, the method comprising:

accessing one of a plurality of computers linked to a primary display device, a plurality of near end secondary display devices, and a plurality of far end secondary display devices through a network, each of the plurality of near end secondary display devices and the each of the plurality of far end secondary display devices comprising multiple display areas, wherein each display area of a near end secondary display device is mirrored by exactly one display area of a far end secondary display device, and wherein the quantity of near end secondary display devices exceeds the quantity of far end secondary display devices;

retrieving a device identifier for each of the plurality of near end secondary display devices such that each one of the near end secondary display devices is identifiable on a first graphical user interface of the primary display device;

retrieving a unique ID for each of the multiple display areas such that each one of the multiple display areas of the near end secondary display devices is concurrently identifiable using the first graphical user interface of the primary display device;

associating, using two or more second graphical user interfaces of two or more second computers from amongst the plurality of computers, a plurality of content elements with the multiple display areas based on the unique ID for each of the multiple display areas;

controlling, using the first graphical user interface, display of a content element from amongst the plurality of content elements in each of the display areas, wherein each of the content elements displayed is different;

receiving one or more annotation inputs using at least one of the two or more second graphical user interfaces and concurrently receiving one or more annotation inputs using a different second graphical user interface from among the two or more graphical user interfaces;

revising, responsive to the one or more annotation inputs, a depiction of at least one content element from amongst the plurality of content elements displayed in each of the display areas, so as to include one or more annotations corresponding to the one or more annotation inputs;

revising, responsive to the one or more annotation inputs, one or more content elements from amongst the plurality of content elements displayed in each of the display areas, so as to include the one or more annotations; and storing, on a storage medium, the content elements as a presentation with a chronological identifier, wherein the content elements include the revised content elements.

2. The method of claim 1, further comprising:
displaying a first content element on a first display area from amongst the multiple display areas;
displaying a second content element on the first display area so as to replace the first content element displayed thereon; and
displaying the first content element on a second display area.

3. The method of claim 2, the first content element having been previously displayed on a different display device from amongst the plurality of display devices.

4. The method of claim 2, wherein the first display area is of a first display device and the second display area is of a second display device.

5. The method of claim 4, wherein the first display device and the second display device are located proximate one another in a single meeting location.

6. The method of claim 5, wherein:
the first display device corresponds to a third display device located in a meeting room at a far end location and the second display device corresponds to a fourth display device in the meeting room at the far end location; and
the third display device and the fourth display device display the same content elements as displayed in the display devices to which each corresponds.

7. The method of claim 2, further comprising:
displaying the second content element on the second display area; and
displaying a third content element on the first display area so as to replace the second content element displayed thereon.

8. The method of claim 7, further comprising displaying the first content element on a third display area.

9. A system for displaying information in a story-board fashion utilizing a plurality of computing devices, a network, and a plurality of display devices, the system comprising:
at least one processor in signal communication with a computer readable storage medium, the computer readable storage medium storing instructions, executable by the processor to cause the processor to:

access one of the plurality of computing devices linked to a primary display device, a plurality of near end secondary display devices, and a plurality of far end secondary display devices through a network, each of the plurality of near end secondary display devices and each of the plurality of far end secondary display devices comprising multiple display areas, wherein each display area of a near end secondary display device is mirrored by exactly one display area of a far end secondary display device, and wherein the quantity of near end secondary display devices exceeds the quantity of far end secondary display devices;

retrieve a device identifier for each of the plurality of near end secondary display devices such that each one of the near end secondary display devices is identifiable on a first graphical user interface of the primary display device;

retrieve a unique ID for each of the multiple display areas such that each one of the multiple display areas of the near end secondary display devices is concurrently identifiable using the first graphical user interface of the primary display device;

associate, using two or more second graphical user interfaces of two or more second computing devices from amongst the plurality of computing devices, a plurality of content elements with the multiple display areas based on the unique ID for each of the multiple display areas;

control, using the first graphical user interface, display of a content element from amongst the plurality of content elements in each of the display areas;

receive, via one or more of the two or more second graphical user interfaces, one or more annotation inputs;

revise, responsive to the one or more annotation inputs, a depiction of at least one content element from amongst the plurality of content elements displayed in each of the display areas, so as to include one or more annotations corresponding to the one or more annotation inputs;

revise, responsive to the one or more annotation inputs, one or more content elements from amongst the plurality of content elements displayed in each of the display areas, so as to include the one or more annotations; and store, the content elements as a presentation with a chronological identifier, wherein the content elements include the revised one or more content elements.

10. The system of claim 9, wherein the instructions further comprise instructions to cause the processor to:
display a first content element on a first display area from amongst the multiple display areas;
display a second content element on the first display area so as to replace the first content element displayed thereon; and
display the first content element on a second display area.

11. The system of claim 10, the first content element having been previously displayed on a different display device from amongst the plurality of display devices.

12. The system of claim 10, wherein the first display area is of a first display device and the second display area is of a second display device.

13. The system of claim 12, wherein the first display device and the second display device are located proximate one another in a single meeting location.

14. The system of claim 13 wherein:
the first display device corresponds to a third display device located in a meeting room at a far end location and the second display device corresponds to a fourth display device in the meeting room at the far end location; and
the instructions further comprise instructions to cause the third and fourth display devices to display the same content elements as displayed in the display devices to which each corresponds.

15. The system of claim 10, the instructions further comprising instructions to cause the processor to:
display the second content element on the second display area; and
display a third content element on the first display area so as to replace the second content element displayed thereon.

16. The system of claim 15, the instructions further comprising instructions to cause the processor to display the first content element on a third display area.

17. A non-transitory computer readable storage medium storing instructions for displaying information in a storyboard fashion utilizing a plurality of computing devices, a network, and a plurality of display devices, the instructions executable to cause a processor to:
access one of the plurality of computing devices linked to a primary display device, a plurality of near end secondary display devices, and a plurality of far end secondary display devices through a network, each of the plurality of near end secondary display devices and each of the plurality of far end secondary display devices comprising multiple display areas, wherein each display area of a near end secondary display device is mirrored by exactly one display area of a far end secondary display device, and wherein the quantity of near end secondary display devices exceeds the quantity of far end secondary display devices;

retrieve a device identifier for each of the plurality of near end secondary display devices such that each one of the near end secondary display devices is identifiable on a first graphical user interface of the primary display device;

retrieve a unique ID for each of the multiple display areas such that each one of the multiple display areas of the near end secondary display devices is concurrently identifiable using the first graphical user interface of the primary display device;

associate, using two or more second graphical user interfaces of two or more second computing devices from amongst the plurality of computing devices, a plurality of content elements with the multiple display areas based on the unique ID for each of the multiple display areas;

control, using the first graphical user interface, display of a content element from amongst the plurality of content elements in each of the display areas, wherein each of the content elements displayed is different;

receiving, at one or more of the two or more second graphical user interfaces, one or more annotation inputs;

revise, responsive to the one or more annotation inputs, a depiction of at least one content element from amongst the plurality of content elements displayed in each of the display areas, so as to include one or more annotations corresponding to the one or more annotation inputs;

revise, responsive to the one or more annotation inputs, one or more content elements from amongst the plurality of content elements displayed in each of the display areas, so as to include the one or more annotations; and store, on at least one storage medium, the content elements as a presentation with a chronological identifier, wherein the content elements include the revised content elements.

18. The non-transitory computer readable storage medium of claim 17, wherein the instructions are further executable to cause the processor to:

display a first content element on a first display area from among the multiple display areas;

display a second content element on the first display area so as to replace the first content element displayed thereon; and display the first content element on a second display area.

19. The non-transitory computer readable storage medium of claim 18, the first content element having been previously displayed on a different display device from amongst the plurality of display devices.

20. The non-transitory computer readable storage medium of claim 17, wherein the primary display device is a portable electronic device.

* * * * *